Figure 1:
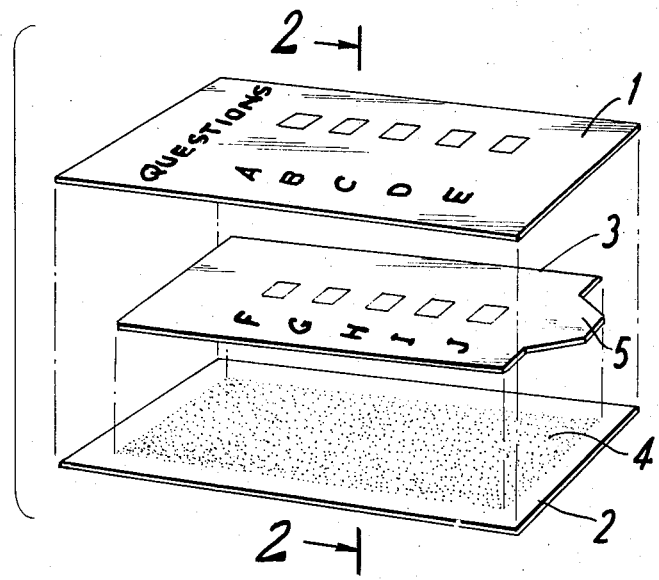

United States Patent [19]
Lowi

[11] 3,789,520
[45] Feb. 5, 1974

[54] INFORMATION RECORDING DEVICE
[76] Inventor: Bertram H. Lowi, 135 Amity St., Brooklyn, N.Y. 11201
[22] Filed: June 9, 1972
[21] Appl. No.: 261,320

[52] U.S. Cl. .............................................. 35/48 A
[51] Int. Cl. .......................................... G09b 3/06
[58] Field of Search ............. 35/48; 282/22 A, 27 A

[56] References Cited
UNITED STATES PATENTS

| | | | |
|---|---|---|---|
| 3,693,267 | 9/1972 | Bertolet | 35/48 A |
| 1,883,775 | 10/1932 | Finkenbinder | 35/48 A |
| 2,614,338 | 10/1952 | Clark | 35/48 A |
| 3,280,483 | 10/1966 | Davenport | 35/48 A |
| 3,359,656 | 12/1967 | Seekins | 35/48 A |

Primary Examiner—Robert W. Michell
Assistant Examiner—J. H. Wolff
Attorney, Agent, or Firm—Stephen D. Kahn et al.

[57] ABSTRACT

A answer storage device for such purposes as opinion surveying having means for providing two simultaneous records of an answer made by the subject: an overt record made directly by the respondent and visible to him, and a covert record made by a force responsive medium within the form and not visible to the subject or changeable by him.

5 Claims, 5 Drawing Figures

Patented Feb. 5, 1974

3,789,520

INFORMATION RECORDING DEVICE

The present invention is a novel device for recording information or responses to questions posed, for example, in public opinion surveys.

Opinion surveys may be conducted in many ways. Interviewers may question the subjects in person or by telephone, or survey forms may be sent to the subjects in some manner such as by mail, to be returned after the questions contained on the forms have been answered. The latter method is significantly less expensive than the former, because the former's need for trained interviewers and its requirement of establishing direct personal communication with the subjects of the survey are eliminated. The latter method, however, suffers from one major deficiency which has heretofore lessened its reliability and reduced its usefulness substantially.

When a subject is questioned by a live interviewer, the subject is unable to "look ahead." That is, a subject being questioned by an interviewer has no way of looking at question B before responding to question A. In many surveys, this condition is vital to obtaining the desired information concerning a subject's bare response to question A. In mail surveys heretofore, by contrast, there has been no way to prevent a subject from reading and considering the entire list of questions before irrevocably responding to any. The present invention provides a novel way of effectively restraining the subject from altering his first response after referring to a later question.

The invention comprises an information storage device for opinion surveys and the like having means initially in registry for providing two simultaneous records or responses: an overt record visible to the subject or interviewee and a covert record invisible to the interviewee. The device further is constructed so that the subject may not bring a later question into view without at the same time altering the device in such a way that the covert record of the subject's initial response to an earlier question may no longer be altered.

Figure 2:
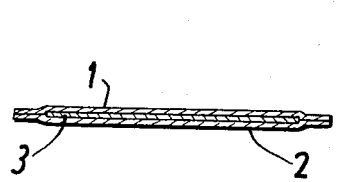
Figure 3:
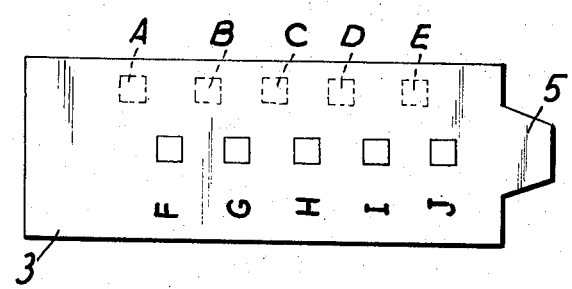
Figure 4:
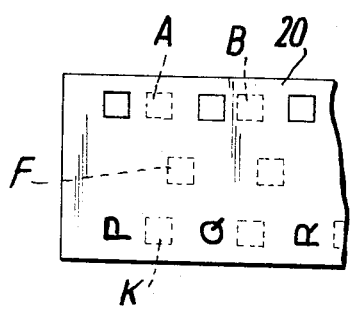
Figure 5:
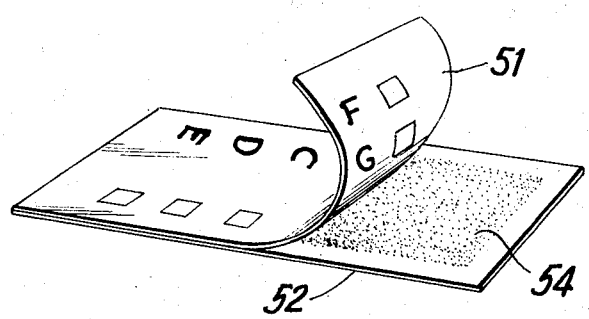

The features of the invention will be more apparent from the illustrative embodiments described and illustrated in the accompanying drawings, in which:

FIG. 1 is a perspective exploded view of one embodiment of the present invention, FIG. 2 is a sectional view of the embodiment shown in FIG. 1 taken along the line 2—2 in FIG. 1, FIG. 3 is a top view of the middle element of the embodiment of FIG. 1, FIG. 4 is a partial top view of a middle sheet of a further embodiment of the present invention, and FIG. 5 is a perspective view of a still further embodiment of the present invention.

Referring to FIGS. 1–3, the illustrative embodiment shown includes a top sheet 1 and a bottom sheet 2 of equal size joined together on three sides to form an envelope into which a somewhat smaller middle sheet 3 is inserted.

The top and middle sheets may be paper or any other material which can be written upon. As is shown in FIG. 2, the envelope should provide a tight fit for middle sheet 3 so that, once removed, its reinsertion is difficult. Bottom sheet 2 has a coating 4 of a marking material on its upper surface. The marking material could be carbon paper, or microencapsulated ink or other suitable marking material to produce a mark or record on the lower surface of sheet 3 when writing force is applied on the upper surface of sheet 1. The marking material could also be in the form of a machine readable product wherein the mark is a change in magnetic, electrical or other physical property. It may be advantageous in some applications to use a marking material or ink which is not visible to the subject of the survey, for reasons more fully explained below. This material could be invisible (a magnetic, electrical, or other physical property), not visible until developed, or visible only under special lighting, such as ultra-violet.

In the illustrative embodiment of FIG. 1, questions A through E are printed on the upper surface of top sheet 1. Instructions provided with the device request that responses be written in the boxes provided on the upper surface of sheet 1 before the inner sheet, sheet 3, is withdrawn from the envelope. As the subject enters his responses in boxes on sheet 1, the marking material 4 on the upper surface of sheet 2 will covertly record the answers on the lower surface of sheet 3, still positioned in registry between sheets 1 and 2. If the responses are invisibly marked on sheet 3, the subject will not realize that sheet 3 has covertly recorded his responses to questions A through E.

When the subject withdraws sheet 3, by pulling the tab 5, a second group of questions F through J becomes visible. Should the subject, after reading questions F through J, decide to alter his response to one or more of the first group of questions A through E, he will do so by erasing the appropriate response initially placed on sheet 1 and inserting his new response in its place. His initial response, however, is preserved on the lower surface of sheet 3. It is unlikely that the subject will first attempt to reinsert sheet 3 into the envelope formed by sheets 1 and 2, particularly if the envelope is dimensioned to make this operation difficult. The subject is instructed to return the entire device so that he will not likely suspect that sheet 3 carries a record of his initial responses to questions A through E as well as his responses to questions F through J. As is shown in FIG. 3, the upper surface of sheet 3 carries questions F through J and their associated response boxes, and the lower surface of sheet 3 carries the initial responses to questions A through E, in the areas outlined in dotted lines in FIG. 3.

The foregoing embodiment is employed when the initial answers to the first group of questions are to be preserved. Where it is desirable to preserve the initial, bare responses to the second group of questions, the device just described may be repeated in "nesting" fashion. That is, sheet 3 could itself be a complete device of the type shown in FIG. 1, having simply an internal sheet or a still further entire device of the type shown in FIG. 1. The sheet 20, a portion of which is shown in FIG. 4, represents an innermost sheet in such a "nested" construction. The upper side of sheet 20 contains questions P through T with associated response boxes, and the lower side of sheet 20 contains the initial covertly recorded responses to three earlier series of questions, all recorded, if desired, in invisible marking material. In a "nested" construction, the response boxes at each level must be positioned so that they do not overlie the boxes at any other level. This placement of response boxes assures that the records of initial responses on the back of sheet 20 will not overlap and obscure each other.

It will be apparent that in most cases only the innermost sheet, equivalent to sheet 3 in the embodiment of FIG. 1 or sheet 20 in the embodiment of FIG. 4, need be examined when the entire form is returned since all responses are recorded on that innermost sheet. The subjects, however, may be ignorant of this fact and therefore will have no reason to suspect the initial response recording features of this device.

Other refinements are possible. A pressure responsive material, for example, could be coated directly on the lower surface of the middle sheet instead of on the upper surface of the bottom sheet. Envelope and sheet configurations could also be employed which hamper or prevent the reinsertion of the middle sheet into the envelope once it has been withdrawn.

An alternative illustrative embodiment is pictured in FIG. 5. Here response positions A through E are contained on the upper surface of top sheet 51 and questions and response positions F through J, on the lower surface of sheet 51. The covert marking material 54 is coated on the upper surface of bottom sheet 52, and sheets 51 and 52 are initially fastened together. This device may be designed so that sheet 52 is destroyed by the subject in uncovering questions F through J. A subject responding to questions A through E will make an overt record on the upper surface of sheet 51 and, simultaneously, a covert record on the lower surface of sheet 51, superimposed on questions F through J. When the subject tears off sheet 52, or otherwise removes it from beneath sheet 51, questions and response positions F through J will for the first time become visible.

It will now be seen that in all embodiments the overt response storage position, the covert response storage position, and the marking material are initially in some stacked or overlying relationship or registry, and that the uncovering of later questions can only be accomplished by separating one of those elements from that relationship. Once that separation has been effected and because the device is designed with means to prevent the reestablishment of that relationship, alteration of the record in the covert response storage position is highly unlikely.

The manifold uses of the described device will also now be seen. In addition to opinion surveys, the device may be used for examinations, applications of all types, tamper-proof receipts of all types, etc. Responses may consist of words, marks, numbers, etc., and they may be written or typed on the device. Other uses will occur to those who examine the disclosure of this invention.

I claim:

1. An answer storage device for providing a record of an initial answer and for effectively preventing the subsequent alteration of the record, comprising:

first storage means having a location for overtly recording an initial answer, second storage means having a location for covertly recording the same answer, the second storage means further including a different location for overtly recording a further answer, mark producing means responsive to the entry of the overt recording of the initial answer for simultaneously covertly recording the initial answer on the second storage means, the first storage means, second storage means and mark producing means being in registry, and means for irreversibly separating from registry at least one of the first storage means, second storage means, and mark producing means to expose the different location on the second storage means for the overt recording of the further answer by the separation from said registry.

2. An answer storage device according to claim 1 wherein the location for overtly recording an answer is on the upper surface of the first storage means and wherein the mark producing means is located beneath the second storage means.

3. An answer storage device according to claim 1 wherein the location for overtly recording an answer is on the upper surface of the first storage means and wherein the mark producing means is interposed between the first and second storage means.

4. An answer storage device according to claim 1 wherein the first storage means comprises the upper surface of a sheet of recording material and the second storage means comprises the lower surface of the same sheet.

5. An answer storage device according to claim 1 wherein the covert recording is invisible.

* * * * *